US010664057B2

(12) United States Patent
Yamazaki et al.

(10) Patent No.: US 10,664,057 B2
(45) Date of Patent: May 26, 2020

(54) ELECTRONIC DEVICE AND CONTROL METHOD

(71) Applicant: LENOVO (SINGAPORE) PTE. LTD., Singapore (SG)

(72) Inventors: Mitsuhiro Yamazaki, Yokohama (JP); Fusanobu Nakamura, Yokohama (JP); Kazunori Yamamura, Yokohama (JP); Jake Laurence Pat Santiago, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 52 days.

(21) Appl. No.: 16/031,883

(22) Filed: Jul. 10, 2018

(65) Prior Publication Data

US 2019/0310709 A1    Oct. 10, 2019

(30) Foreign Application Priority Data

Apr. 9, 2018    (JP) ................................ 2018-074568

(51) Int. Cl.
*F02B 37/22*    (2006.01)
*G06F 3/01*    (2006.01)
*G06F 3/041*    (2006.01)

(52) U.S. Cl.
CPC ............ *G06F 3/016* (2013.01); *G06F 3/0412* (2013.01); *G06F 3/0416* (2013.01)

(58) Field of Classification Search
CPC ........ G06F 3/016; G06F 3/0412; G06F 3/0416
See application file for complete search history.

(56) References Cited

U.S. PATENT DOCUMENTS

| | | | |
|---|---|---|---|
| 2012/0044644 A1* | 2/2012 | Harlan | F04D 25/166 361/695 |
| 2014/0245139 A1* | 8/2014 | Lee | G06F 3/04842 715/702 |
| 2015/0332565 A1* | 11/2015 | Cho | G08B 6/00 310/317 |

FOREIGN PATENT DOCUMENTS

JP    2017-091340 A    5/2017

* cited by examiner

*Primary Examiner* — Muhammad S Islam
(74) *Attorney, Agent, or Firm* — Shimokaji IP

(57) ABSTRACT

To appropriately control an input portion by haptic feedback an electronic device has a vibration generator vibrating an input portion in response to contact with the input portion, a driving circuit portion supplying a driving signal having an acceleration period including a first pulse of a predetermined pulse width vibrating the vibration generator by resonance and a deceleration period including a second pulse of a phase opposite to the phase of the first pulse to the vibration generator, and a vibration control portion changing the number of first pulses included in the driving signal supplied to the vibration generator by the driving circuit portion according to the operating environment.

7 Claims, 10 Drawing Sheets

| DUTY RATIO | ACCELERATION (G) | CHANGE RATE (%) |
|---|---|---|
| 100% | 7.3 | 100 |
| 80% | 6.6 | 75 |
| 60% | 6.4 | 64 |
| 40% | 5.8 | 42 |
| 20% | 5.1 | 14 |
| 0% | 4.7 | 0 |

ELECTRONIC DEVICE AND CONTROL METHOD

FIELD OF THE INVENTION

The present invention relates to an electronic device and a control method.

BACKGROUND OF THE INVENTION

In recent years, in electronic devices, such as a tablet terminal, a haptic feedback technology (HAPTICS technology) is known which transmits a haptic sense to a user by vibrating a vibration generator when the user touches a touch panel (e.g., see Japanese Patent Application Laid-Open No. 2017-91340).

SUMMARY OF THE INVENTION

In the above-described electronic devices, in order to obtain a click feeling of an input portion, such as a keyboard, by haptic feedback according to the haptic feedback technology described above, the sense of touch which allows a user to feel one impact (shock) has been desired. In order to realize the click feeling, it is necessary to reach a high peak acceleration in a shorter rise time. Former electronic devices have realized the click feeling by a driving signal utilizing resonance using a vibration generator, such as an LRA (Linear Resonant Actuator), for example. However, it has been difficult for the former electronic devices to appropriately control the vibration generator because the characteristics of the vibration generator vary depending on the use environment.

The present invention has been made in order to solve the above-described problems. It is an object of the present invention to provide an electronic device and a control method capable of appropriately controlling an input portion by the haptic feedback.

In order to solve the above-described problems, one aspect of the present invention is an electronic device having a vibration generator vibrating an input portion in response to contact with the input portion, a driving circuit portion supplying a driving signal having an acceleration period including a first pulse of a predetermined pulse width vibrating the vibration generator by resonance and a deceleration period including a second pulse of a phase opposite to the phase of the first pulse to the vibration generator, and a vibration control portion changing the number of times of first pulses included in the driving signal supplied to the vibration generator by the driving circuit portion according to an operating environment.

According to one aspect of the present invention, the above-described electronic device may be configured so that the operating environment includes an operating voltage of the driving circuit portion which is a driving voltage of the driving signal and the vibration control portion changes the number of times of the first pulses according to the operating voltage so that the maximum acceleration of the vibration falls within a predetermined range.

According to one aspect of the present invention, the above-described electronic device may be configured so that the vibration control portion changes the number of times of the first pulses according to the operating voltage so that the maximum acceleration of the vibration falls within the predetermined range and the power consumption in operating the vibration generator is minimized.

According to one aspect of the present invention, the above-described electronic device may be configured so that the operating environment includes an operating temperature and the vibration control portion changes the number of times of the first pulses according to the operating temperature so that the device reaches a temperature equal to or less than a predetermined temperature.

According to one aspect of the present invention, the above-described electronic device may be configured so that the vibration control portion estimates the operating temperature based on the operation frequency of the vibration generator.

According to one aspect of the present invention, the above-described electronic device may be configured so as to have an acceleration detection portion detecting the maximum acceleration of the vibration and may be configured so that the vibration control portion changes the number of times of the first pulses so that the maximum acceleration of the vibration detected by the acceleration detection portion falls within the predetermined range.

According to one aspect of the present invention, the above-described electronic device may be configured so that the driving signal includes a modulated waveform obtained by subjecting one of two or more of the first pulses to pulse width modulation in the acceleration period and the vibration control portion changes the duty ratio of the modulated waveform according to a set vibration intensity level.

According to one aspect of the present invention, a control method includes a driving step of supplying a driving signal having an acceleration period including a first pulse of a predetermined pulse width vibrating a vibration generator by resonance and a deceleration period including a second pulse of a phase opposite to the phase of the first pulse to the vibration generator in response to contact with an input portion by a driving circuit portion, a vibration generating step of vibrating the input portion by the vibration generator based on the driving signal supplied by the driving step, and a vibration control step of changing the number of times of the first pulses included in the driving signal supplied by the driving step according to the operating environment by the vibration control portion.

The above-described aspects of the present invention can appropriately control the input portion by the haptic feedback.

DETAILED DESCRIPTION OF THE INVENTION

Hereinafter, an electronic device according to one embodiment of the present invention is described with reference to the drawings.

First Embodiment

Figure 1:
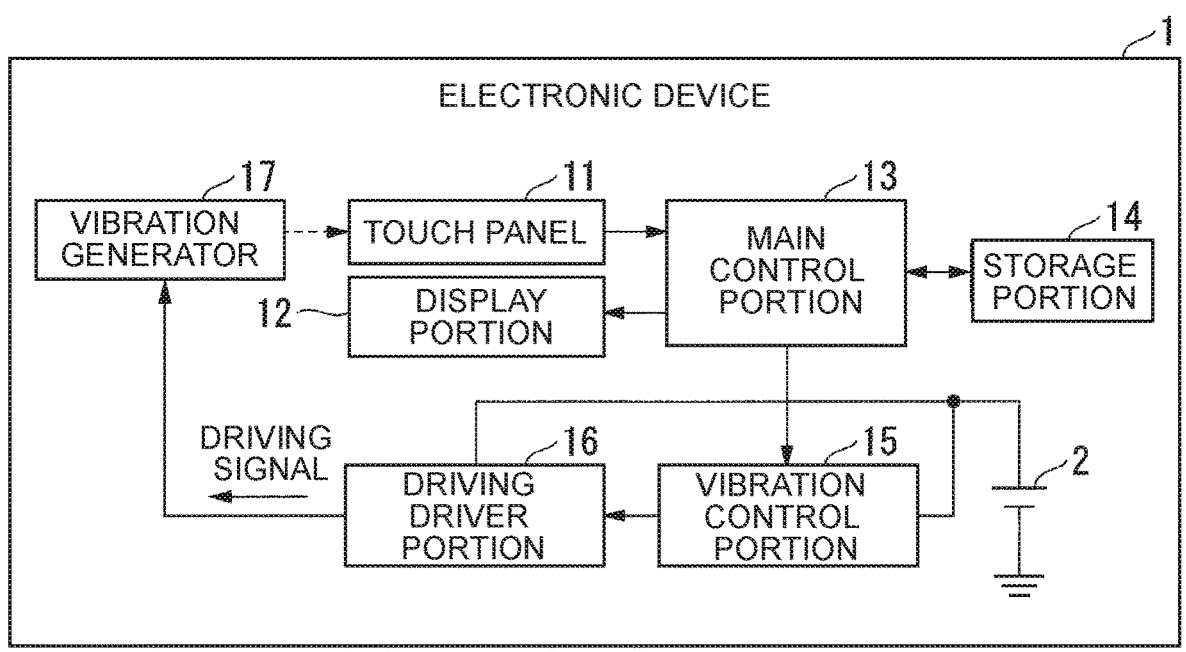
FIG. 1 is a block diagram illustrating an example of an electronic device according to a first embodiment.
Figure 2:
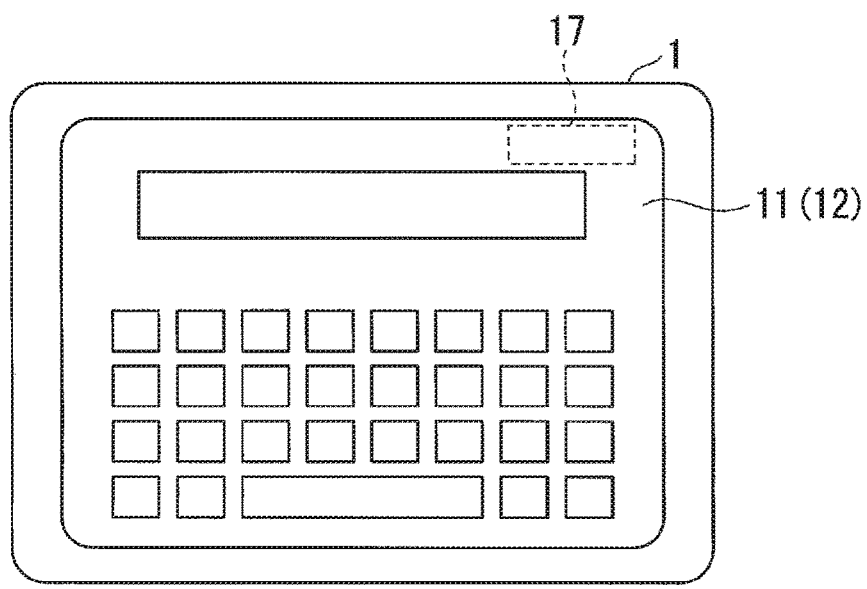
FIG. 2 is an outside view illustrating an example of the electronic device according to the first embodiment.

FIG. 1 is a block diagram illustrating an example of an electronic device 1 according to this embodiment. FIG. 2 is an outside view illustrating an example of the electronic device 1 according to this embodiment. As illustrated in FIG. 1, the electronic device 1 has a battery 2, a touch panel 11, a display portion 12, a main control portion 13, a storage portion 14, a vibration control portion 15, a driving driver portion 16, and a vibration generator 17. As illustrated in FIG. 2, the electronic device 1 is a tablet terminal, in which the touch panel 11 acquires an input operation of a flat keyboard displayed on the display portion 12 to perform various kinds of processing, for example. The electronic device 1 vibrates the vibration generator 17 when the touch panel 11 is touch-operated as the flat keyboard to realize a click feeling of the keyboard.

The battery 2 is a rechargeable battery, such as a lithium ion battery, and supplies power to the portions of the electronic device 1, for example. The battery 2 is directly connected to the driving driver portion 16 and supplies an operating voltage of the driving driver portion 16 which is a driving voltage of a driving signal of the vibration generator 17 described later.

The touch panel 11 (an example of the input portion) is an input device receiving an input operation, such as a touch operation, from a user and functions as a flat keyboard, for example. The touch panel 11 outputs input information indicating the received input operation to the main control portion 13. The display portion 12 is a liquid crystal display device, for example, and displays various kinds of information, such as an image of the keyboard described above, by the control from the main control portion 13.

The main control portion 13 is a processor containing a CPU (Central Processing Unit) and the like, for example, and comprehensively controls the electronic device 1. The main control portion 13 causes the display portion 12 to display an operation screen of various kinds of processing and the like, and acquires the input information indicating an input operation received by the touch panel 11 to perform various kinds of processing according to the input information, for example.

For example, the main control portion 13 causes the display portion 12 to display an image of the keyboard illustrated in FIG. 2, and then acquires input information indicating a touch operation of the flat keyboard received by the touch panel 11. The main control portion 13 outputs trigger information for vibrating the vibration generator 17 to the vibration control portion 15 in response to the touch operation of the flat keyboard by the touch panel 11. Thus, the touch panel 11 and the display portion 12 vibrate, so that a user obtains a click feeling by the touch operation. The storage portion 14 stores various kinds of information utilized for processing performed by the electronic device 1.

Figure 3:
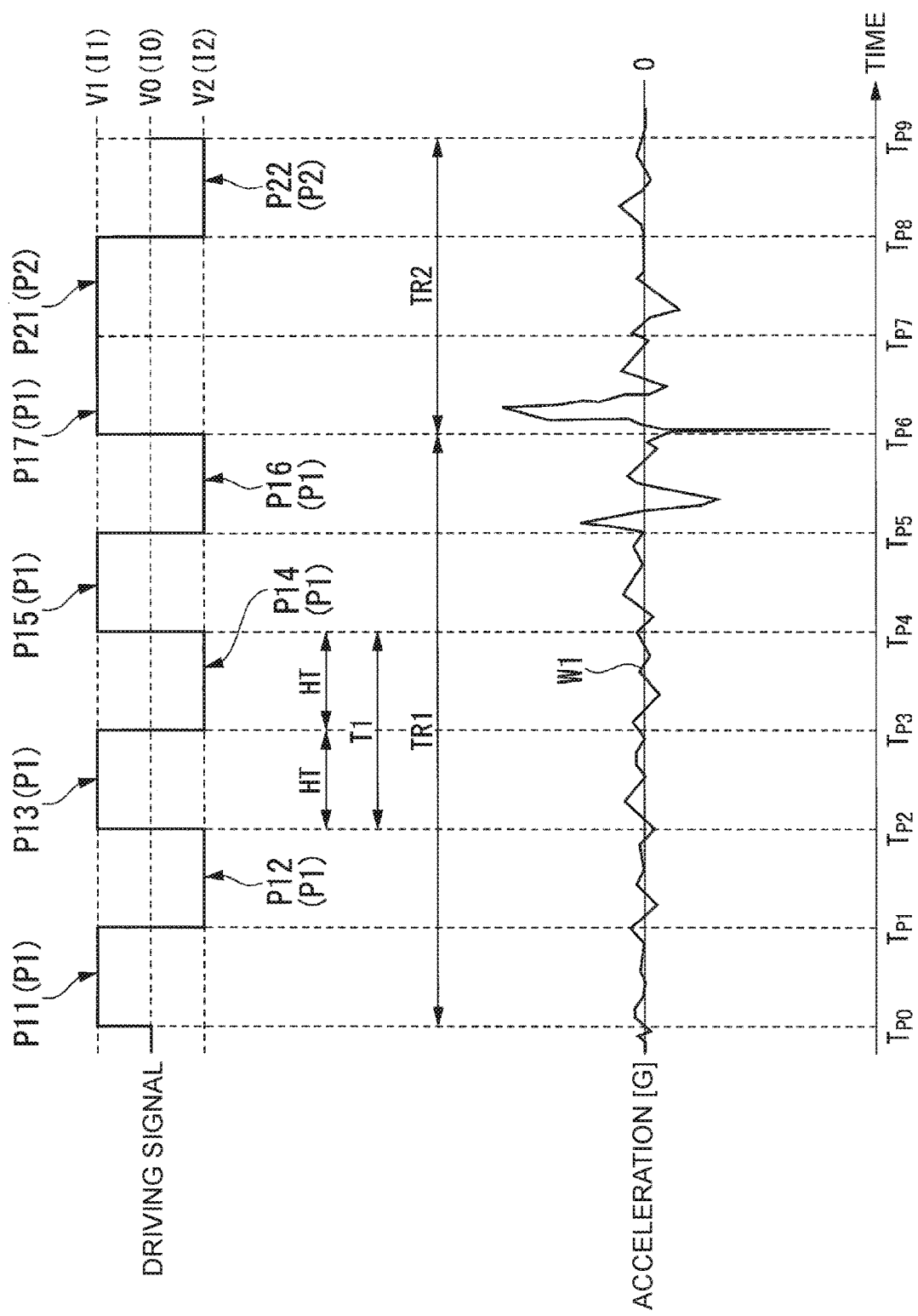
FIG. 3 is a view illustrating an example of a driving signal and the acceleration by vibration of a vibration generator according to the first embodiment.

The vibration control portion 15 generates a driving signal according to the trigger information for vibrating the vibration generator 17, and then outputs the generated driving signal to the driving driver portion 16. The driving signal has an acceleration period and a deceleration period as illustrated in FIG. 3. The acceleration period includes first pulses P1 (P11 to P17) of a predetermined pulse width (HT) vibrating the vibration generator 17 by resonance and the deceleration period includes second pulses P2 (P21, P22) of a phase opposite to the phase of the first pulse P1. The details of the acceleration by the driving signal and the vibration are described later with reference to FIG. 3. The acceleration period may include at least one first pulse P1, and the deceleration period may include at least one second pulses P2.

The vibration control portion 15 changes the number of times the first pulses P1 are included in the driving signal supplied to the vibration generator 17 by the driving driver portion 16 according to the operating environment. Herein, the operating environment includes the operating voltage of the driving driver portion 16 which is a driving voltage of the driving signal, for example. The vibration control portion 15 changes the number of first pulses P1 so that the maximum acceleration of the vibration in the vibration generator 17 falls within a predetermined range according to the operating voltage. Specifically, the vibration control portion 15 increases the number of first pulses P1 when the operating voltage is less than a predetermined threshold value. The vibration control portion 15 reduces the number of first pulses P1 when the operating voltage is higher than a predetermined threshold value to reduce the power consumption. Thus, the vibration control portion 15 changes the number first pulses P1 so that the maximum acceleration of the vibration falls within the predetermined range and the power consumption in operating the vibration generator 17 is minimized according to the operating voltage.

For the predetermined threshold value, a plurality of values is set. The vibration control portion 15 changes the number of first pulses P1 based on table information in which the range between the plurality of values and the number of first pulses P1 are matched with each other, for example.

The driving driver portion 16 (an example of the driving circuit portion) supplies the driving signal generated by the vibration control portion 15 to the vibration generator 17. The driving driver portion 16 converts the driving signal received from the vibration control portion 15 to a voltage (signal level conversion) by the operating voltage supplied from the battery 2, and then supplies the same to the vibration generator 17.

The vibration generator 17 is an actuator utilizing resonance, such as an LRA (Linear Resonant Actuator), for example, and vibrates the touch panel 11 based on the driving signal supplied from the driving driver portion 16. More specifically, the vibration generator 17 vibrates the touch panel 11 in response to contact with the touch panel 11. Herein, the driving signal and the acceleration by the vibration of the vibration generator 17 in this embodiment are described with reference to FIG. 3.

FIG. 3 is a view illustrating an example of the driving signal and the acceleration by the vibration of the vibration generator 17 in this embodiment. As illustrated in FIG. 3, the driving signal has an acceleration period TR1 and a deceleration period TR2. The acceleration period TR1 is a period of increasing the intensity (acceleration) of the vibration by resonance and includes the first pulses P1 (P11 to P17) of the predetermined pulse width (HT) vibrating the vibration generator 17 by resonance. In the example illustrated in FIG. 3, the acceleration period TR1 is a waveform including the seven first pulses P1 (P11 to P17). The pulse P11 to pulse P17 are rectangular waves of a pulse width HT and are all equivalent to the first pulse P1. The pulse width HT of the first pulse P1 is equivalent to a substantially half period of a cycle T1 of the resonance frequency of the vibration generator 17.

The deceleration period TR2 is a period of decelerating the vibration of the vibration generator 17 and includes the second pulse P2 (P21, P22) of a phase opposite to the phase of the first pulse P1 described above. Pulse P21 and pulse P22 are rectangular waves of the same pulse width HT as that of the first pulses P1 described above and are all equivalent to the second pulse P2.

The vibration generator 17 vibrates like a waveform W1 by the supply of the driving signal illustrated in FIG. 3. Herein, the waveform W1 indicates the acceleration by the vibration of the vibration generator 17. The horizontal axis of the graph indicates time and the vertical axis indicates the acceleration (G). As illustrated by the waveform W1, the vibration generator 17 increases the amplitude of the acceleration in a short period of time by resonance with the first pulses P1 (P11 to P17), and then decelerates in a short period of time by the second pulses P2 (P21, P22) in the deceleration period TR2 to stop the vibration. In FIG. 3, times $T_{P1}$ to time $T_{P9}$ indicate the time of every half period (pulse width HT) of the resonance frequency of the vibration generator 17 based on start time $T_{P0}$ of the driving signal.

Thus, the vibration generator 17 greatly vibrates the touch panel 11 in a short period of time, and then stops the vibration in a short period of time, for example, based on the driving signal to thereby realize a click feeling when a user operates the touch panel 11. The vibration control portion 15 changes the number of first pulses P1 of the driving signal illustrated in FIG. 3 according to the operating voltage.

Figure 4:
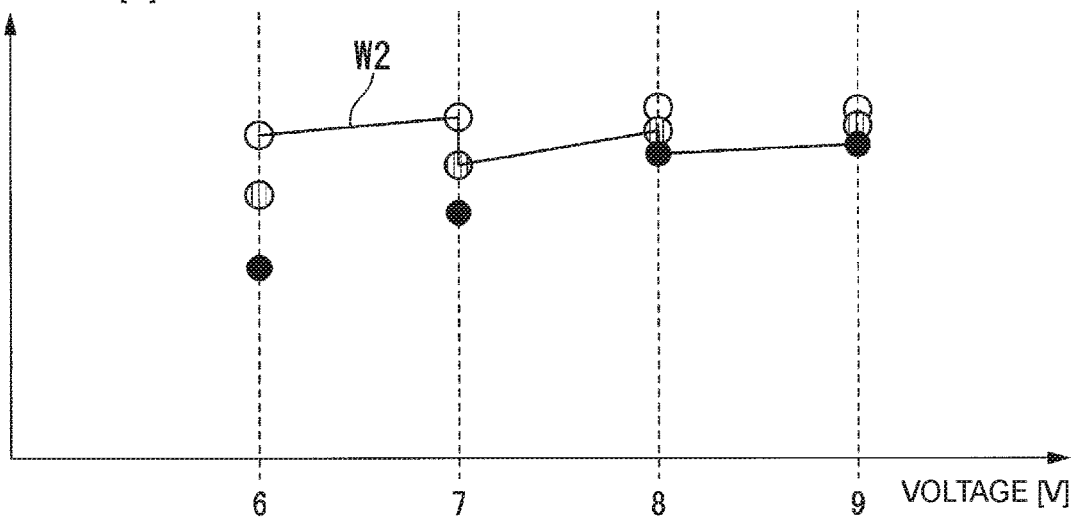
FIG. 4 is a view illustrating an example of the relationship between a driving voltage and the number of times of first pulses, and the acceleration by vibration of the vibration generator.

Next, an example of controlling of the number of first pulses P1 by the vibration control portion 15 is described with reference to FIG. 4 and FIG. 5. FIG. 4 is a view illustrating an example of the relationship between the driving voltage and the number of first pulses P1, and the acceleration by vibration of the vibration generator 17 according to this embodiment. In this view, the vertical axis indicates the acceleration and the horizontal axis indicates the power supply voltage (driving voltage). White circle marks indicate the maximum acceleration of the vibration generator 17 when the number first pulses P1 is 8 and the vertical-stripe circle marks indicate the maximum acceleration of the vibration generator 17 when the number of first pulses P1 is 7. Black circle marks indicate the maximum acceleration of the vibration generator 17 when the number of first pulses P1 is 6.

Figure 5:
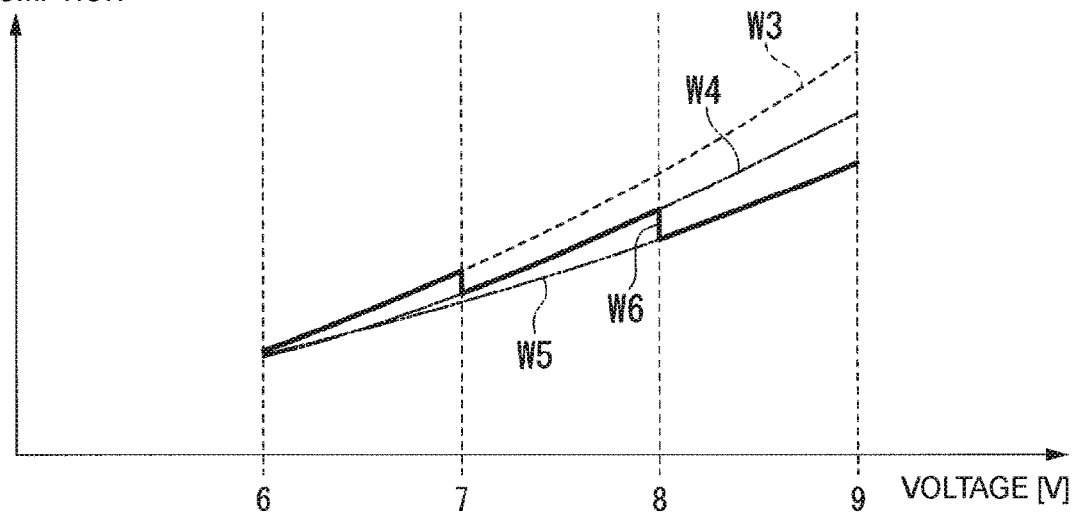
FIG. 5 is a view illustrating an example of the relationship between the driving voltage and the number of times of first pulses, and the power consumption of the vibration generator.

FIG. 5 is a view illustrating an example of the relationship between the driving voltage and the number of first pulses P1, and the power consumption of the vibration generator 17 according to this embodiment. In this view, the vertical axis indicates the power consumption of the vibration generator 17 and the horizontal axis indicates the power supply voltage (driving voltage). A waveform W3 indicates changes of the power consumption when the number of first pulses P1 is 8 and a waveform W4 indicates changes of the power consumption when the number of first pulses P1 is 7. A waveform W5 indicates changes of the power consumption when the number of first pulses P1 is 6.

The vibration control portion 15 changes the number of first pulses P1 like waveform W2 of FIG. 4 and waveform W6 of FIG. 5 according to the power supply voltage. The vibration control portion 15 sets the number of first pulses P1 of the driving signal to 7 when the operating voltage is within the range of 7 V to 8 V, for example. When an output voltage of the battery 2 decreases, so that the power supply voltage decreases to less than 7 V (when the power supply voltage is within the range of 6 V to 7 V), for example, the vibration control portion 15 changes the number of first pulses P1 of the driving signal to 6 to compensate the shortage of the maximum acceleration due to the reduction in the power supply voltage.

When the battery 2 is charged, so that the power supply voltage increases to 8 V or more (when the power supply voltage is within the range of 8 V to 9 V), for example, the vibration control portion 15 changes the number of first pulses P1 of the driving signal to 6 to suppress the increase in the power consumption by the increase in the power supply voltage (see waveform W6 of FIG. 5). The setting for the number of first pulses P1 is stored in a setting storage portion (not illustrated) in the vibration control portion 15, for example.

Figure 6:
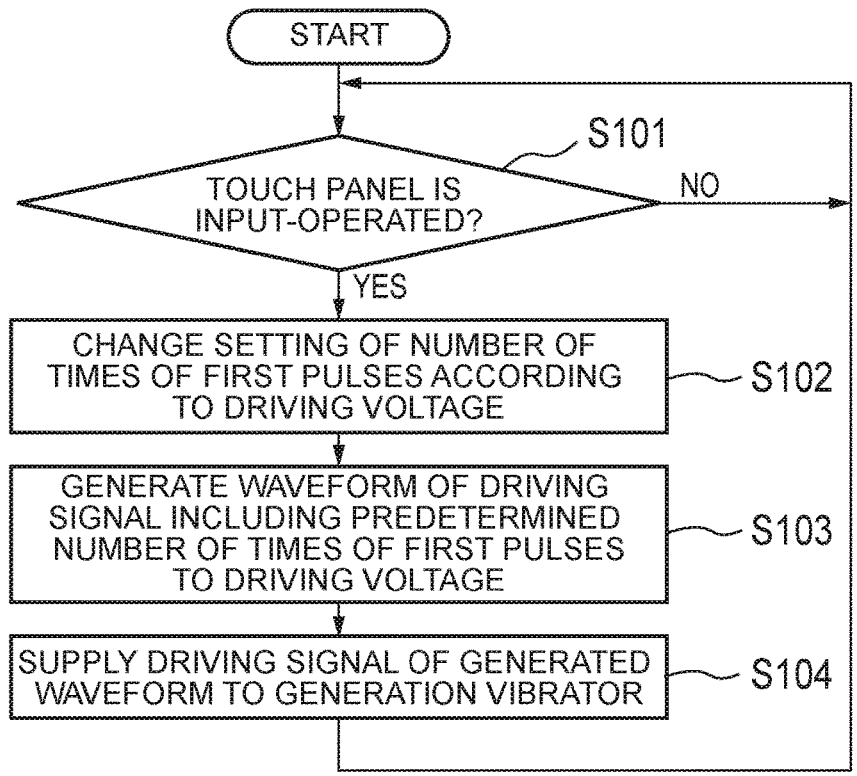
FIG. 6 is a flow chart illustrating an example of an operation of the electronic device according to the first embodiment.

Next, an operation of the electronic device 1 according to this embodiment is described with reference to the drawings. FIG. 6 is a flow chart illustrating an example of the operation of the electronic device 1 according to this embodiment. The example illustrated in FIG. 6 describes an operation of the electronic device 1 of vibrating the vibration generator 17 when the touch panel 11 is touch-operated to realize a click feeling of the flat keyboard.

In FIG. 6, the main control portion 13 of the electronic device 1 determines whether the touch panel 11 is input-operated (Step S101). The main control portion 13 determines whether the touch panel 11 is input-operated based on the input information indicating the input operation received from the touch panel 11, for example. The main control portion 13 proceeds to the processing of Step S102 when the touch panel 11 is input-operated (Step S101: YES). The main control portion 13 outputs trigger information for vibrating the vibration generator 17 to the vibration control portion 15 when the touch panel 11 is input-operated. The main control portion 13 returns the processing to Step S101 when the touch panel 11 is not input-operated (Step S101: NO).

In Step S102, the vibration control portion 15 changes the setting of the number of first pulses P1 according to the driving voltage. The vibration control portion 15 acquires the output voltage of the battery 2 as the driving voltage (power supply voltage) of the vibration generator 17 using an ADC (Analog to Digital Converter), for example. The vibration control portion 15 changes the setting of the number of first pulses P1, like the waveform W2 of FIG. 4 and the waveform W6 of FIG. 5 described above, according to the driving voltage. More specifically, the vibration control portion 15 changes the number of first pulses P1 according to the driving voltage so that the maximum acceleration of the vibration falls within the predetermined range and the power consumption in operating the vibration generator 17 is minimized.

Next, the vibration control portion 15 generates a waveform of the driving signal including a predetermined number of times of the first pulses P1 (Step S103). The vibration control portion 15 generates a waveform of the driving signal in which the number of first pulses P1 is changed according to the setting of the number of first pulses P1, for example. The vibration control portion 15 outputs the generated driving signal to the driving driver portion 16.

Next, the driving driver portion 16 supplies the driving signal of the waveform generated by the vibration control portion 15 to the vibration generator 17 (Step S104). The driving driver portion 16 converts the driving signal received from the vibration control portion 15 to a voltage conversion by the driving voltage supplied from the battery 2, and then supplies the same to the vibration generator 17. Thus, the vibration generator 17 vibrates at an acceleration within the predetermined range to vibrate the touch panel 11 to realize a click feeling when the touch panel 11 is input-operated. After the processing of Step S104, the electronic device 1 returns the processing to Step S101.

As described above, the electronic device 1 according to this embodiment has the vibration generator 17, the driving driver portion 16 (driving circuit portion), and the vibration control portion 15. The vibration generator 17 vibrates the touch panel 11 in response to contact with the touch panel 11 (input portion). The driving driver portion 16 (driving circuit portion) supplies the driving signal having the acceleration period TR1 including the first pulses P1 of the predetermined pulse width (HT) vibrating the vibration generator 17 by resonance and the deceleration period TR2 having the second pulses P2 of a phase opposite to the phase of the first pulse P1 to the vibration generator 17. The vibration control portion 15 changes the number of first pulses P1 included in the driving signal supplied to the vibration generator 17 by the driving driver portion 16 according to the operating environment. Thus, the electronic device 1 according to this embodiment can appropriately control the touch panel 11 by means of the haptic feedback technology (HAPTICS technology). More specifically, the electronic device 1 according to this embodiment can preferably obtain a click feeling of the flat keyboard while suppressing the power consumption according to the operating environment.

In this embodiment, the operating environment includes the operating voltage of the driving driver portion 16 which is a driving voltage of the driving signal. The vibration control portion 15 changes the number of first pulses P1 so that the maximum acceleration of vibration falls within the predetermined range according to the operating voltage. Thus, the electronic device 1 according to this embodiment can compensate for the reduction in maximum acceleration of the vibration generator 17 due to a lower driving voltage in the case of a simple configuration in which the output voltage of the battery 2 is directly connected for use as the driving voltage of the vibration generator 17, for example.

In this embodiment, the vibration control portion 15 changes the number of first pulses P1 according to the operating voltage so that the maximum acceleration of the vibration falls within the predetermined range and the power consumption in operating the vibration generator 17 is minimized. Thus, the electronic device 1 according to this embodiment can reduce the power consumption without changing the click feeling of the flat keyboard.

The control method according to this embodiment includes a driving step, a vibration generating step, and a vibration control step. In the driving step, the driving driver portion 16 supplies the driving signal having an acceleration period including the first pulses of the predetermined pulse width vibrating the vibration generator 17 by resonance and the deceleration period including the second pulses of a phase opposite to the phase of the first pulse to the vibration generator 17 in response to contact with the touch panel 11. In the vibration generating step, the vibration generator 17 vibrates the touch panel 11 based on the driving signal supplied by the driving step. In the vibration control step, the vibration control portion 15 changes the number of first pulses P1 included in the driving signal supplied by the driving step according to the operating environment. Thus, the control method according to this embodiment can exhibit the same effects as those of the electronic device 1 described above and can appropriately control the touch panel 11 by means of the haptic feedback technology (HAPTICS technology).

Second Embodiment

Next, an electronic device 1a according to a second embodiment is described with reference to the drawings. This embodiment describes an example in which the operating temperature is applied as the operating environment.

Figure 7:
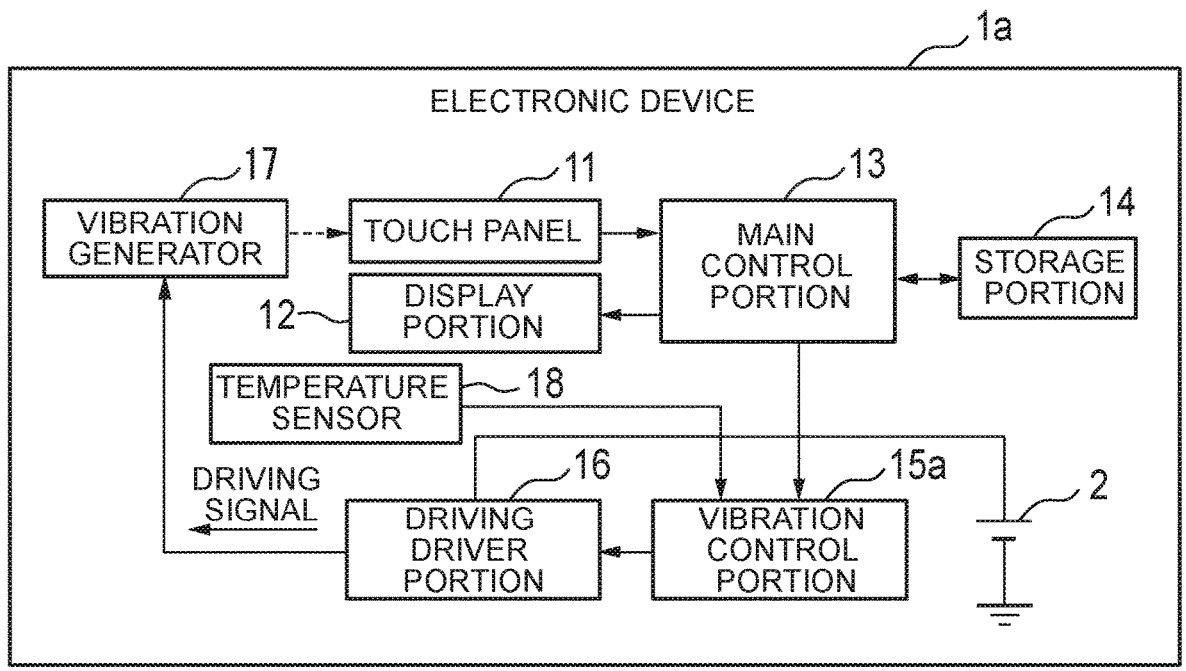
FIG. 7 is a block diagram illustrating an example of an electronic device according to a second embodiment.

FIG. 7 is a block diagram illustrating an example of the electronic device 1a according to the second embodiment. As illustrated in FIG. 7, the electronic device 1a has a battery 2, a touch panel 11, a display portion 12, a main control portion 13, a storage portion 14, a vibration control portion 15a, a driving driver portion 16, a vibration generator 17, and a temperature sensor 18. In this view, the same configurations as those of FIG. 1 are designated by the same reference numerals and a description thereof is omitted. The appearance of the electronic device 1a is the same as that of the first embodiment illustrated in FIG. 2.

The temperature sensor 18 detects an operating temperature of the electronic device 1a. The temperature sensor 18 detects the ambient temperature of the display portion 12 as the operating temperature, and then outputs the detected operating temperature to the vibration control portion 15a, for example. The basic function of the vibration control portion 15a is the same as that of the vibration control portion 15 of the first embodiment, and generates a driving signal according to trigger information for vibrating the vibration generator 17, and then outputs the generated driving signal to the driving driver portion 16. The vibration control portion 15a is different from the vibration control portion 15 of the first embodiment in that the number of first pulses P1 is changed according to the operating temperature instead of the operating voltage.

The vibration control portion 15a changes the number of first pulses P1 according to the operating temperature detected by the temperature sensor 18 based on the temperature of the device (electronic device 1a) being equal to or less than a predetermined temperature. Herein, the predetermined temperature is the upper limit temperature of devices (components) provided in the electronic device 1a and is the upper limit temperature of the display portion 12, for example. For example, when the temperature reaches a predetermined threshold temperature that is based on the upper limit temperature of the display portion 12, the vibration control portion 15a reduces the number of first pulses P1 to reduce the power consumption so that the temperature does not exceed the upper limit temperature of the display portion 12.

For the predetermined threshold temperature, a plurality of values may be set. In this case, the vibration control portion 15a changes the number of first pulses P1 based on table information in which the range between the plurality of values and the number of first pulses P1 are matched with each other, for example.

Figure 8:
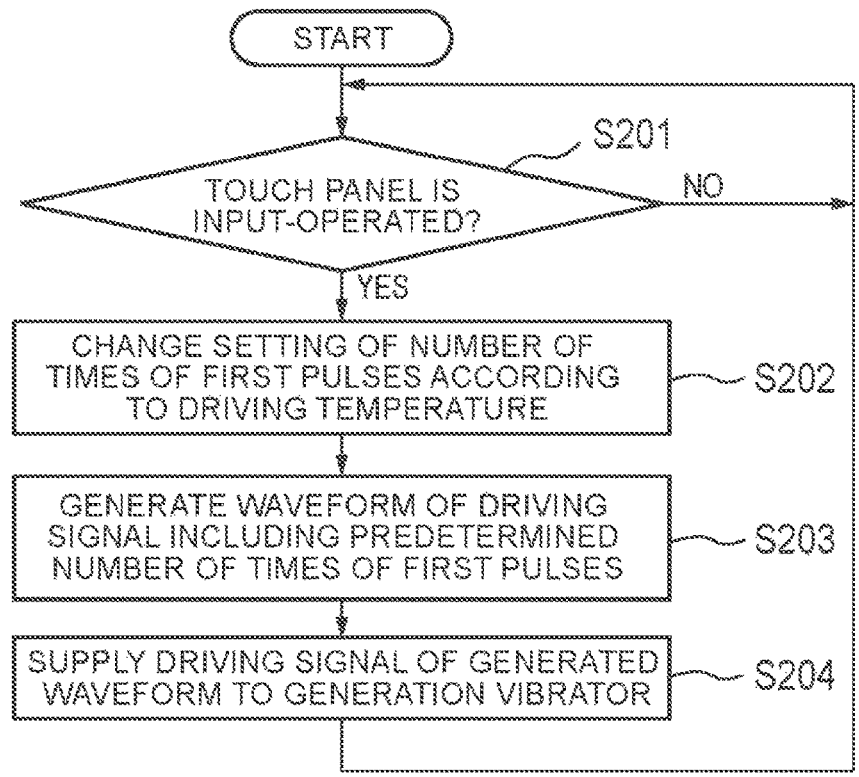
FIG. 8 is a flow chart illustrating an example of an operation of the electronic device according to the second embodiment.

Next, an operation of the electronic device 1a according to this embodiment is described with reference to the drawings. FIG. 8 is a flow chart illustrating an example of the operation of the electronic device 1a according to this embodiment. The example illustrated in FIG. 8 describes an operation of the electronic device 1a of vibrating the vibration generator 17 when the touch panel 11 is touch-operated to realize a click feeling of a flat keyboard.

In FIG. 8, processing of Step S201 is the same as the processing of Step S101 illustrated in FIG. 6 described above. The main control portion 13 proceeds the processing of Step S202 when the touch panel 11 is input-operated (Step S201: YES) and returns the processing to Step S201 when the touch panel 11 is not input-operated (Step S201: NO).

In Step S202, the vibration control portion 15a changes the setting of the number of the first pulses P1 according to the operating temperature. The vibration control portion 15a acquires the operating temperature detected by the temperature sensor 18, for example. The vibration control portion 15a changes the setting of the number of first pulses P1 according to the operating temperature. The vibration control portion 15a changes the setting so as to reduce the number of first pulses P1 when the operating temperature reaches the predetermined threshold temperature, for example.

Processing of the subsequent Step S203 and processing of the subsequent Step S204 are the same as the processing of Step S103 and the processing of Step S104 illustrated in FIG. 6 described above, and therefore a description thereof is omitted herein. After the processing of Step S204, the electronic device 1a returns the processing to Step S201.

As described above, the electronic device 1a according to this embodiment has the vibration generator 17, the driving driver portion 16 (driving circuit portion), and the vibration control portion 15a. The vibration control portion 15a changes the number of first pulses P1 included in the driving signal supplied to the vibration generator 17 by the driving driver portion 16 according the operating environment (for example, operating temperature). Herein, the operating environment includes the operating temperature of portions of the electronic device 1a, such as the display portion 12, for example. The vibration control portion 15a changes the number of first pulses P1 according to the operating temperature so that the device reaches a temperature equal to or less than a predetermined temperature. Thus, the electronic device 1a according to this embodiment can preferably obtain the click feeling of the flat keyboard by the operation of the vibration generator 17, for example, while preventing the electronic device 1a or devices provided in the electronic device 1a from reaching the upper limit temperature, for example.

Third Embodiment

Next, an electronic device 1b according to a third embodiment is described with reference to the drawings. This embodiment describes another example in which the operating temperature is applied as the operating environment, modified by estimating the operating temperature (power consumption) based on the use frequency (operation frequency of the vibration generator 17) of the touch panel 11 without a temperature sensor 18.

Figure 9:
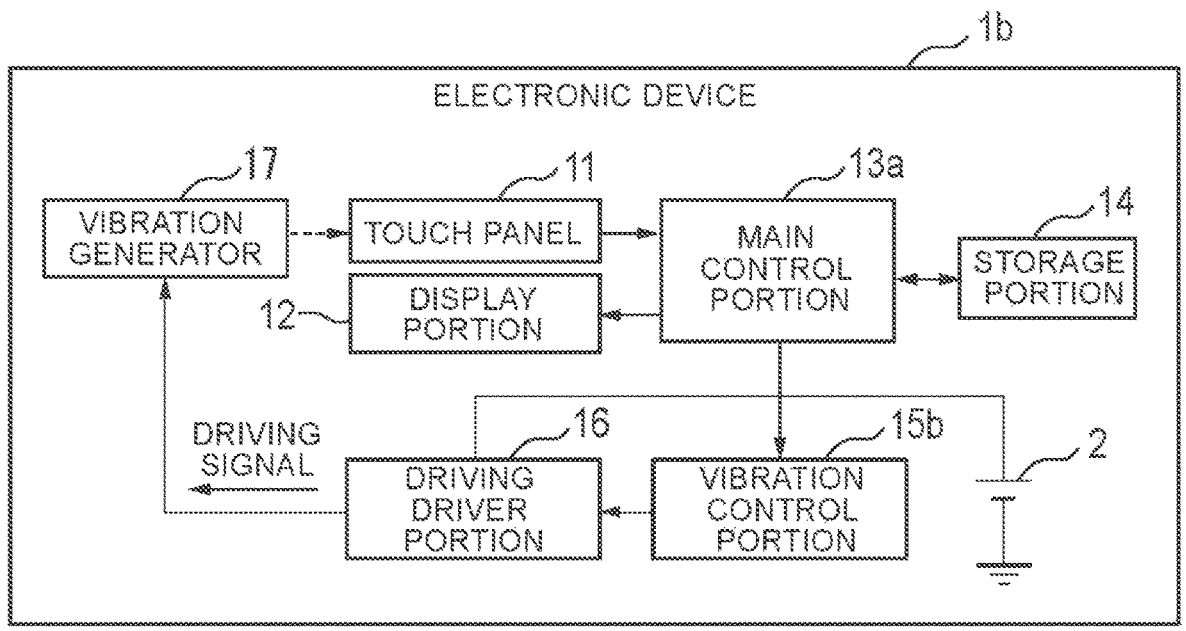
FIG. 9 is a block diagram illustrating an example of an electronic device according to a third embodiment.

FIG. 9 is a block diagram illustrating an example of the electronic device 1b according to the third embodiment. As illustrated in FIG. 9, the electronic device 1b has the battery 2, the touch panel 11, the display portion 12, a main control portion 13a, the storage portion 14, a vibration control portion 15b, the driving driver portion 16, and the vibration generator 17. In this view, the same configurations as those of FIG. 1 are designated by the same reference numerals and a description thereof is omitted. The appearance of the electronic device 1b is the same as that of the first embodiment illustrated in FIG. 2.

The main control portion 13a is a processor containing a CPU and the like, for example, and comprehensively controls the electronic device 1b. The basic function of the main control portion 13a is the same as that of the main control portion 13 of the first embodiment and causes the display portion 12 to display an operation screen of various kinds of processing and the like and acquires input information indicating an input operation received by the touch panel 11 to perform various kinds of processing according to the input information, for example. The main control portion 13a calculates the use frequency (operation frequency of the vibration generator 17) of the touch panel 11, and then causes the storage portion 14 to store the same. Herein, the use frequency of the touch panel 11 is the typing speed (for example, average typing speed) indicating the number of typed characters in one second, for example. The main control portion 13a outputs trigger information for vibrating the vibration generator 17 and typing speed information to be stored by the storage portion 14 to the vibration control portion 15b according to a touch operation of the flat keyboard by the touch panel 11 to vibrate the vibration generator 17.

The basic function of the vibration control portion 15b is the same as that of the vibration control portion 15a of the second embodiment and generates a driving signal according to the trigger information for vibrating the vibration generator 17, and then outputs the generated driving signal to the driving driver portion 16. The vibration control portion 15b is different from the vibration control portion 15a of the second embodiment in that the number of first pulses P1 is changed according to the typing speed information acquired from the main control portion 13a. The vibration control portion 15b estimates the operating temperature based on the typing speed information, for example, and then changes the number of first pulses P1 so that the device (electronic device 1b) reaches a temperature equal to or less than a predetermined temperature according to the estimated operating temperature. Herein, the relationship between the typing speed and the temperature of the touch panel 11 is described with reference to FIG. 10.

Figure 10:
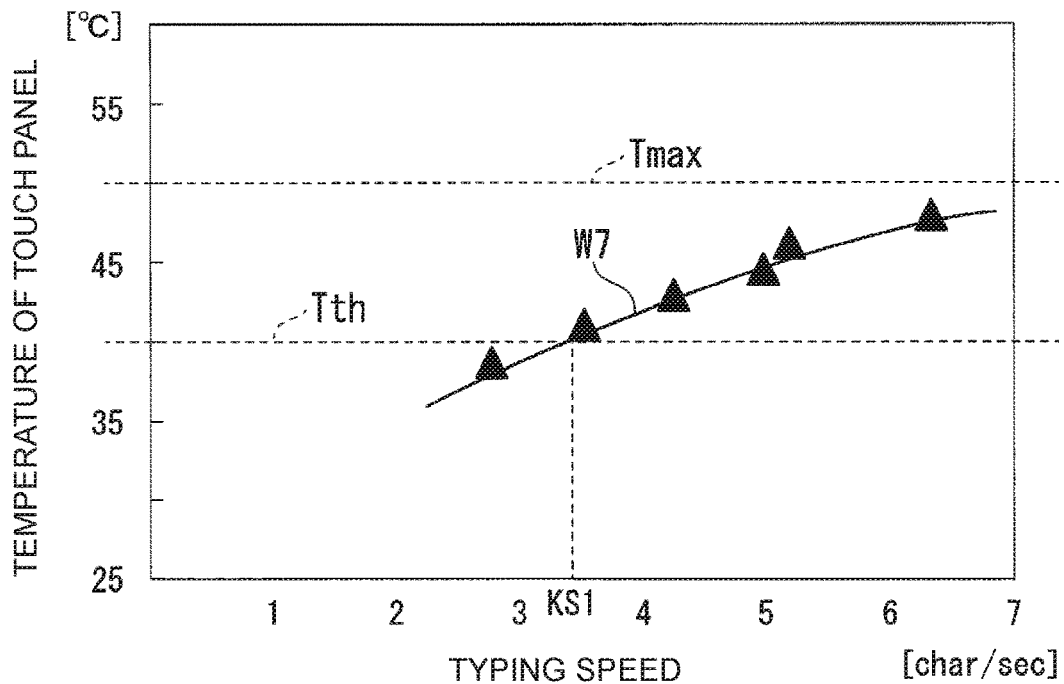
FIG. 10 is a view illustrating an example of the relationship between the typing speed and the temperature of a touch panel in the third embodiment.

FIG. 10 is a view illustrating an example of the relationship between the typing speed and the temperature of the touch panel 11 in this embodiment. In FIG. 10, the vertical axis indicates the temperature of the touch panel 11 and the horizontal axis indicates the typing speed. A waveform W7 indicates the relationship between the typing speed and the temperature of the touch panel 11. The typing speed corresponds to the operation frequency of the vibration generator 17. A temperature Tmax indicates the upper limit temperature of the display portion 12 and a temperature Tth indicates a predetermined threshold temperature determined based on the temperature Tmax.

The vibration control portion 15b estimates the operating temperature based on the waveform W7 of FIG. 10, for example, and then changes the number of first pulses P1 according to the estimated operating temperature so that the device (electronic device 1b) reaches a temperature equal to or less than the upper limit temperature (temperature Tmax) of the display portion 12. Specifically, when the typing speed reaches a typing speed KS1 corresponding to the predetermined threshold temperature Tth, the vibration control portion 15b reduces the number of first pulses P1 to reduce the power consumption.

Figure 11:
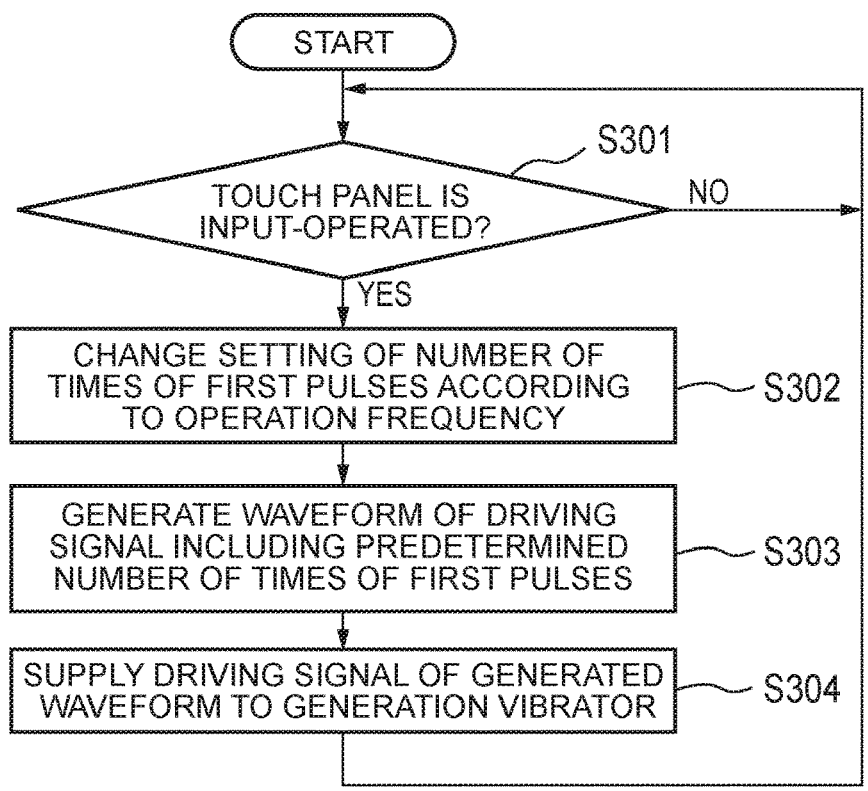
FIG. 11 is a flow chart illustrating an example of an operation of the electronic device according to the third embodiment.

Next, an operation of the electronic device 1b according to this embodiment is described with reference to the drawings. FIG. 11 is a flow chart illustrating an example of the operation of the electronic device 1b according to this embodiment. The example illustrated in FIG. 11 describes an operation of the electronic device 1b of vibrating the vibration generator 17 when the touch panel 11 is touch-operated to realize a click feeling of a flat keyboard.

In FIG. 11, processing of Step S301 is the same as the processing of Step S201 illustrated in FIG. 8 described above. The main control portion 13a proceeds to the processing of Step S302 when the touch panel 11 is input-operated (Step S301: YES) and returns the processing to Step S301 when the touch panel 11 is not input-operated (Step S301: NO).

In Step S302, the vibration control portion 15b changes the setting of the number of first pulses P1 according to the operation frequency. The vibration control portion 15b acquires the typing speed information from the main control portion 13a as the operation frequency of the vibration generator 17, for example, and then changes the setting so as to reduce the number of first pulses P1 when the operation frequency reaches a predetermined value (for example, typing speed KS1 of FIG. 10).

Processing of the subsequent Step S303 and processing of the subsequent Step S304 are the same as the processing of Step S203 and the processing of Step S204 illustrated in FIG. 8 described above, and therefore a description thereof is omitted herein. After the processing of Step S304, the electronic device 1b returns the processing to Step S301.

As described above, in the electronic device 1b according to this embodiment, the vibration control portion 15b estimates the operating temperature (for example, operating temperature of the display portion 12) based on the operation frequency of the vibration generator 17. The vibration control portion 15b changes the number of first pulses P1 so that the device reaches a temperature equal to or less than a predetermined temperature according to the operating temperature. Thus, the electronic device 1b according to this embodiment can preferably obtain the click feeling of the flat keyboard by the operation of the vibration generator 17, for example, while preventing the electronic device 1b or devices provided in the electronic device 1b from reaching the upper limit temperature as with the second embodiment. Moreover, the electronic device 1b according to this embodiment does not need to have the temperature sensor 18, unlike the second embodiment, and can prevent the electronic device 1b or the devices provided in the electronic device 1b from reaching the upper limit temperature with a simple configuration.

In this embodiment, the vibration control portion 15b may be configured so as to change the number of first pulses P1 based on the operation frequency (for example, typing speed) of the vibration generator 17. The vibration control portion 15b may be configured so as to estimate the power consumption or the heat generation amount of the vibration generator 17 instead of the operating temperature, and then change the number of first pulses P1 based on the power consumption or the heat generation amount.

Fourth Embodiment

Next, an electronic device 1c according to a fourth embodiment is described with reference to the drawings. This embodiment describes an example in which the characteristics of components (for example, the driving driver portion 16, the vibration generator 17, and the like) of the electronic device 1c change over time as changes of the operating environment.

Figure 12:
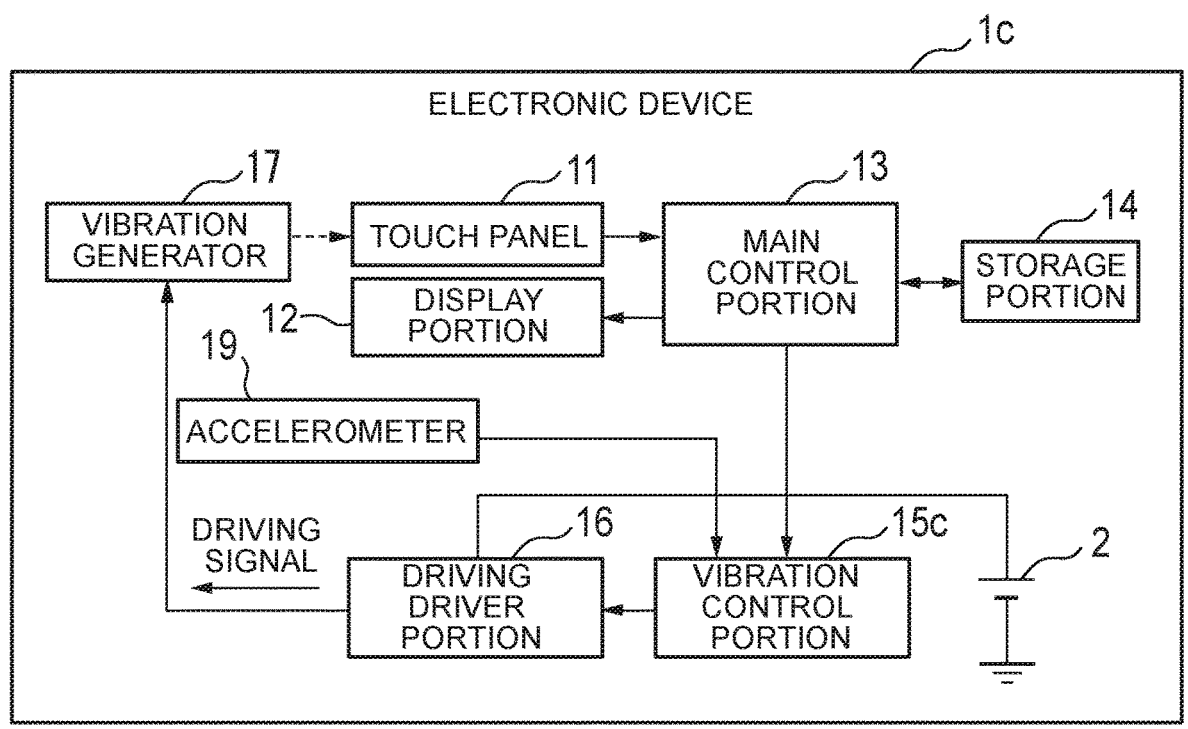
FIG. 12 is a block diagram illustrating an example of an electronic device according to a fourth embodiment.

FIG. 12 is a block diagram illustrating an example of the electronic device 1c according to the fourth embodiment. As illustrated in FIG. 12, the electronic device 1c has a battery 2, a touch panel 11, a display portion 12, a main control portion 13, a storage portion 14, a vibration control portion 15c, a driving driver portion 16, a vibration generator 17, and an accelerometer 19. In this view, the same items as those of FIG. 1 are designated by the same reference numerals and a description thereof is omitted. The appearance of the electronic device 1c is the same as that of the first embodiment illustrated in FIG. 2.

The accelerometer 19 (example of the acceleration detection portion) detects the acceleration (for example, maximum acceleration of vibration) of the vibration of the vibration generator 17 or the touch panel 11. The accelerometer 19 outputs the detected maximum acceleration of the vibration to the vibration control portion 15c. The basic function of the vibration control portion 15c is the same as that of the vibration control portion 15 of the first embodiment and generates a driving signal according to trigger information for vibrating the vibration generator 17, and then outputs the generated driving signal to the driving driver portion 16. The vibration control portion 15c is different from the vibration control portion 15 of the first embodiment in that the number of first pulses P1 is changed according to the maximum acceleration of the vibration detected by the accelerometer 19.

The vibration control portion 15c changes the number of first pulses P1 so that the maximum acceleration of the vibration detected by the accelerometer 19 falls within the predetermined range. Herein, the predetermined range is a range in which a click feeling in input-operating the touch panel 11 can be appropriately obtained by the vibration of the vibration generator 17, for example. For example, when the maximum acceleration of the vibration falls outside of the predetermined range, the vibration control portion 15c increases/reduces the number of first pulses P1 so that the maximum acceleration of the vibration falls within the predetermined range. Specifically, when the maximum acceleration of the vibration decreases due to degradation with time of the driving driver portion 16 or the vibration generator 17, the vibration control portion 15c increases the number of first pulses P1 to compensate for the decrease in maximum acceleration.

Figure 13:
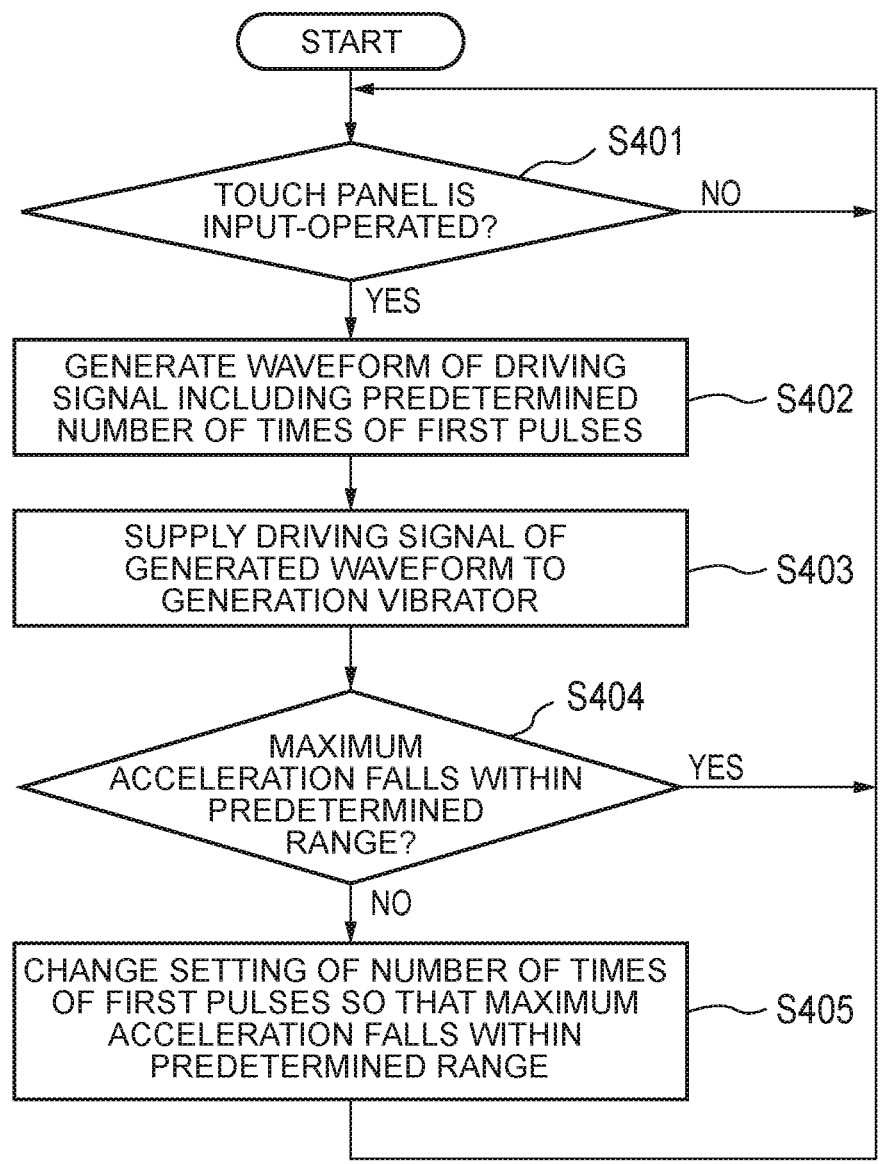
FIG. 13 is a flow chart illustrating an example of an operation of the electronic device according to the fourth embodiment.

Next, an operation of the electronic device 1c according to this embodiment is described with reference to the drawings. FIG. 13 is a flow chart illustrating an example of the operation of the electronic device 1c according to this embodiment. The example illustrated in FIG. 13 describes an operation of the electronic device 1c of vibrating the vibration generator 17 when the touch panel 11 is touch-operated to realize a click feeling of a flat keyboard.

In FIG. 13, processing of Step S401 is the same as the processing of Step S101 illustrated in FIG. 6 described above. The main control portion 13 proceeds the processing to Step S402 when the touch panel 11 is input-operated (Step S401: YES) and returns the processing to Step S401 when the touch panel 11 is not input-operated (Step S401: NO).

Processing of Step S402 and processing of Step S403 are the same as the processing of Step S103 and the processing of Step S104 illustrated in FIG. 6 described above, and therefore a description thereof is omitted herein. Next, the vibration control portion 15c determines whether the maximum acceleration falls within a predetermined range (Step S404). The vibration control portion 15c determines whether the maximum acceleration of the vibration detected by the accelerometer 19 falls within a predetermined range. The vibration control portion 15c returns the processing to Step S401 when the maximum acceleration falls within the predetermined range (Step S404: YES). The vibration control portion 15c proceeds the processing to Step S405 when the maximum acceleration is not within the predetermined range (Step S404: NO).

In Step S405, the vibration control portion 15c changes the setting of the number of first pulses P1 so that the maximum acceleration falls within the predetermined range. After the processing of Step S405, the vibration control portion 15c returns the processing to Step S401.

As described above, the electronic device 1c according to this embodiment has the accelerometer 19 (acceleration detection portion) and the vibration control portion 15c. The accelerometer 19 detects the maximum acceleration of the vibration of the vibration generator 17. The vibration control portion 15c changes the number of first pulses P1 so that the maximum acceleration of the vibration detected by the accelerometer 19 falls within the predetermined range.

Thus, even when the characteristics of the driving driver portion 16, the vibration generator 17, or the like are changed with time (deterioration with time), for example, the electronic device 1c according to this embodiment can appropriately control the touch panel 11 by means of the HAPTICS technology. Moreover, when there are individual differences in the characteristics of the driving driver portion 16, the vibration generator 17, or the like, for example, the electronic device 1c according to this embodiment can similarly appropriately control the touch panel 11 by means of the HAPTICS technology.

The present invention is not limited to the above-described embodiments and can be altered without deviating from the gist of the present invention. For example, the electronic device 1 (1a to 1c) may be configured so as to change the vibration intensity level of the vibration generator 17 in the above-described embodiments. When changing the vibration intensity level, the vibration intensity level may be changed using the pulse width modulation (PWM) as illustrated in FIG. 14.

Figure 14:
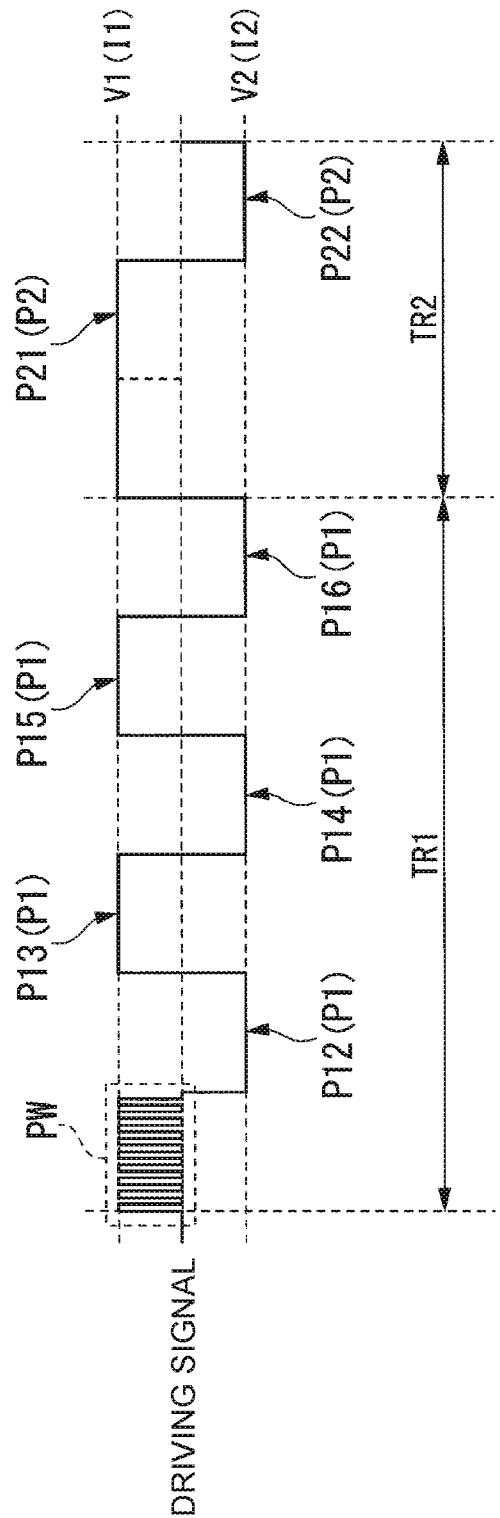
FIG. 14 is a view illustrating a modification of a driving signal by PWM control of the vibration generator.

FIG. 14 is a view illustrating a modification of a driving signal by the PWM control of the vibration generator 17. As illustrated in FIG. 14, the vibration control portion 15 (15a to 15c) subjects one of the plurality of first pulses P1 to pulse width modulation (PWM) in the acceleration period TR1 to generate a driving signal including a PWM waveform PW. In the example illustrated in FIG. 14, the acceleration period TR1 includes the first pulses P1 (P12 to P16) of predetermined pulse width (HT) and the PWM waveform PW (modulated waveform) obtained by performing PWM of the first pulses P1. More specifically, the acceleration period TR1 is a waveform including the PWM waveform PW inserted instead of the initial first pulse P1 and the five first pulses P1 (P12 to P16).

The vibration control portion 15 (15a to 15c) changes the duty ratio of the modulated waveform to the set vibration intensity level. In this case, the main control portion 13 (13a) outputs trigger information for vibrating the vibration generator 17 and intensity level information indicating the vibration intensity level to the vibration control portion 15 (15a to 15c) according to a touch operation of the flat keyboard by the touch panel 11 to vibrate the vibration generator 17. The main control portion 13 (13a) may be configured so as to change (update) the intensity level information stored by the storage portion 14 according to an input operation of changing (updating) the intensity level information received by the touch panel 11.

Figures 15, 16:
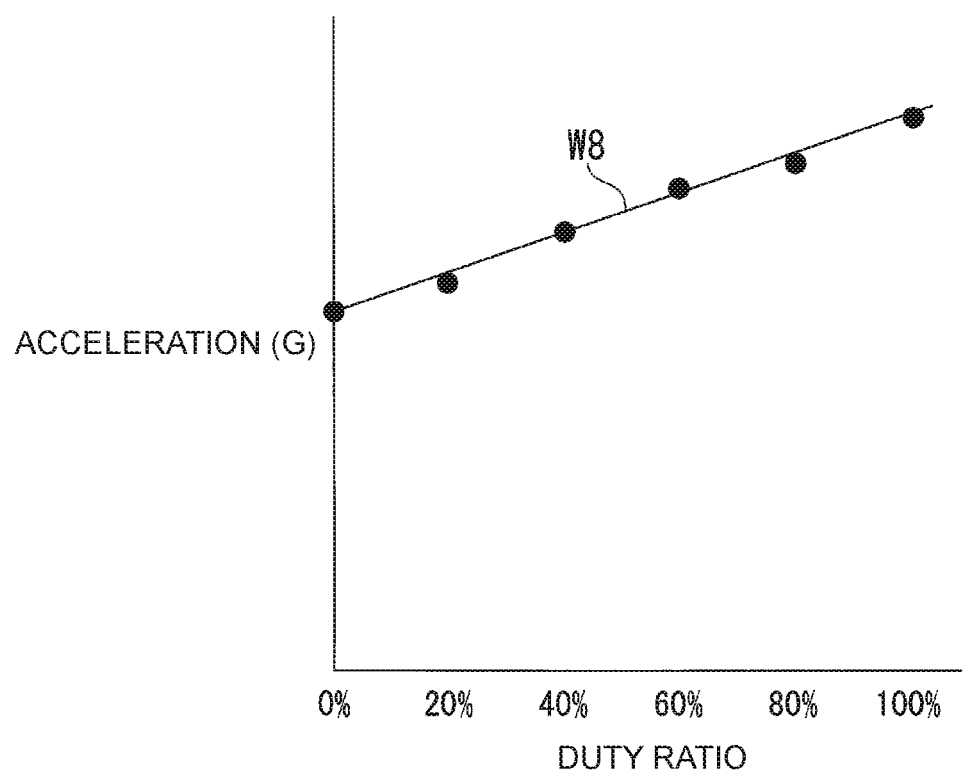
FIG. 15 is a first view illustrating an example of the relationship between the duty ratio in the PWM control and the acceleration by vibration.
FIG. 16 is a second view illustrating an example of the relationship between the duty ratio in the PWM control and the acceleration by vibration.

FIG. 15 and FIG. 16 are views illustrating the relationship between the duty ratio in the PWM control and the acceleration by the vibration. In FIG. 15, the "duty ratio" indicates the duty ratio in the PWM waveform PW of the driving signal illustrated in FIG. 14 and the "acceleration (G)" indicates the maximum value of the acceleration (maximum acceleration) of the measured vibration of the vibration generator 17. The "change rate (%)" indicates the change rate when the "acceleration (G)" in a driving signal has a duty ratio of 100% (six first pulses P1) is 100%, based on the "acceleration (G)" in a driving signal having a duty ratio of 0% (five first pulses P1).

In the graph illustrated in FIG. 16, the horizontal axis indicates the "duty ratio" described above and the vertical axis indicates the "acceleration (G)" described above. A waveform W8 indicates the relationship between the "duty ratio" and the "acceleration (G)". As illustrated in FIG. 15 and FIG. 16, the "acceleration (G)" of the vibration of the vibration generator 17 is linearly changed by changing the "duty ratio" by the PWM control of the driving signal. In the electronic device 1 (1a to 1c), the vibration control portion 15 (15a to 15c) generates the driving signal in which the duty ratio is changed as described above according to the vibration intensity level utilizing the noted characteristics. Thus, the intensity (acceleration) of the vibration of the vibration generator 17 can be linearly changed, and thus the click feeling in operating the touch panel 11 by the vibration generator 17 can be adjusted, for example.

The vibration control portion 15 (15a to 15c) may be configured so as to combine the control of changing the number of first pulses P1 and the control of changing the duty ratio of the modulated waveform (PWM waveform PW) described above to set vibration intensity level. Thus, the electronic device 1 (1a to 1c) can more appropriately control the touch panel 11 by means of the haptic feedback technology (HAPTICS technology). With respect to the driving signal of FIG. 14 described above, the example of inserting the PWM waveform PW instead of the initial first pulse P1 is described. However, the vibration control portion 15 (15a to 15c) may be configured so as to insert the PWM waveform PW instead of the second or subsequent first pulses P1.

Moreover, the vibration control portion 15 (15a to 15c) may be configured so as to generate a driving signal including a PWM waveform (modulated waveform for deceleration) obtained by subjecting the second pulse P2 to the pulse width modulation (PWM) according to the set vibration intensity level in the deceleration period TR2. Thus, the electronic device 1 (1a to 1c) can reduce a situation in which the vibration occurs again without stopping because the pulse in the deceleration period TR2 is excessively strong, for example. Therefore, the electronic device 1 (1a to 1c) can appropriately stop the vibration of the vibration generator 17 in a short period of time, and thus can obtain a more preferable click feeling of a key input operation.

The above-described embodiments describe the example of implementing each embodiment alone, but the present invention is not limited thereto and the embodiments may be implemented while combining some or all of the embodiments. The above-described embodiments describe the example in which the electronic device 1 (1a to 1c) is a tablet terminal but the present invention is not limited thereto. The electronic device 1 (1a to 1c) may be an information processing device, such as a Laptop PC (Personal Computer) or a PDA (Personal Digital Assistant), a portable device, such as a smartphone, an input device, such as a keyboard, or the like, for example.

The above-described embodiments describe the example in which the electronic device 1 (1a to 1c) has the touch panel 11 as an example of the input portion but the present invention is not limited thereto and the input portion may be a switch, such as a key switch.

The above-described embodiments describe the example in which the electronic device 1 (1a to 1c) vibrates the vibration generator 17 as a feedback of an input operation but the present invention is not limited thereto and the vibration generator 17 may be vibrated without an input operation in order to give a certain haptic sense or touch sense to a user, for example. For example, the electronic device 1 (1a to 1c) may be a controller of a game device or the like.

In the above-described embodiments, the electronic device 1 (1a to 1c) may be configured so that the vibration control portion 15 (15a to 15c) is included in the main control portion 13 (13a). The above-described embodiments describe the example in which the vibration generator 17 is the LRA but the present invention is not limited thereto and other vibration generators may be acceptable insofar as the vibration generators cause vibration by a driving signal utilizing resonance.

The above-described embodiments describe the example in which the driving signal includes the two second pulses P2 in the deceleration period TR2 but the present invention is not limited thereto and the number of the second pulses P2 may be a number other than 2.

The above-described embodiments describe the example of using the operating voltage or the operating temperature as an example of the operating environment but the present invention is not limited thereto. As the operating environment, a case of operating the electronic device on a table or a case of operating the electronic device on the knee of a user, or the like may be used, for example.

Each configuration provided in the electronic device 1 (1a to 1c) described above has a computer system thereinside. The processing in each configuration provided in the electronic device 1 (1a to 1c) described above may be performed by recording a program for realizing the function of each configuration provided in the electronic device 1 (1a to 1c) described above in a recording medium readable by a computer, and then causing the computer system to read and execute the program recorded in the recording medium. Herein, "causing the computer system to read and execute the program recorded in the recording medium" includes installing the program in the computer system. The "computer system" as used herein includes hardware, as well as the OS or peripheral devices. The "computer system" may also include a plurality of computer devices connected through a network including a communication line, such as the Internet, a WAN, a LAN, and a dedicated line. The "recording medium readable by a computer" refers to portable media, such as a flexible disk, a magneto-optical disk, a ROM, and a CD-ROM, and storage devices, such as a hard disk, built in the computer system. Thus, the recording media storing the program may be a non-transitory recording media, such as a CD-ROM.

The recording medium includes a recording medium, which is provided inside or outside the electronic device accessible from a distribution server in order to distribute the program. A configuration may be acceptable in which the program is divided into a plurality of parts, the divided programs are individually downloaded at different times, and then the divided programs are united by each configuration provided in the electronic device 1 (1a to 1c) or distribution servers individually distributing the divided programs may be different from each other. The "recording medium readably by a computer" includes one holding the program for a definite period of time, such as a volatile memory (RAM), inside the computer system serving as a server or a client when the program is transmitted through the network. The program may be one for realizing some of the functions described above. The program may be one capable of realizing the functions described above in combination with programs already recorded in the computer system, i.e., a so-called a differential file (differential program).

Some or all of the functions may be realized as an integrated circuit, such as an LSI (Large Scale Integration). The functions described above may be individually formed into a processor or some or all of the functions may be integrated to be formed into a processor. A circuit integration technology may be realized not only by LSI but by a dedicated communication circuit or a general-purpose processor. When a circuit integration technology substituting for the LSI appears due to the progress of the semiconductor technology, an integrated circuit obtained by the technology may be used.

What is claimed is:

1. An electronic device comprising:
a vibration generator configured to vibrate an input portion in response to contact with the input portion;
a driving circuit portion configured to supply a driving signal to the vibration generator, the driving signal having an acceleration period including at least one first pulse of a predetermined pulse width vibrating the vibration generator by resonance, and a deceleration period including at least one second pulse of a phase opposite to a phase of the first pulse; and
a vibration control portion configured to change a number of first pulses included in the driving signal supplied to the vibration generator by the driving circuit portion according to an operating environment, wherein
the operating environment includes an operating voltage of the driving circuit portion which is a driving voltage of the driving signal, and
the vibration control portion changes the number of first pulses according to a comparison of a predetermined threshold value and the operating voltage, and makes a maximum acceleration of the vibration fall within a predetermined range.

2. The electronic device according to claim 1, further including:
an acceleration detection portion configured to detect the maximum acceleration of the vibration, wherein
the vibration control portion changes the number of first pulses and makes the maximum acceleration of the vibration detected by the acceleration detection portion fall within the predetermined range.

3. The electronic device according to claim 1, wherein the driving signal includes a modulated waveform obtained by subjecting at least one of the first pulses to pulse width modulation in the acceleration period, and the vibration control portion changes a duty ratio of the modulated waveform according to a set vibration intensity level.

4. The electronic device according to claim 1, wherein the vibration control portion changes the number of first pulses according to the operating voltage and makes the maximum acceleration of the vibration fall within the predetermined range and a power consumption in operating the vibration generator is minimized.

5. An electronic device comprising:
a vibration generator configured to vibrate an input portion in response to contact with the input portion;
a driving circuit portion configured to supply a driving signal to the vibration generator, the driving signal having an acceleration period including at least one first pulse of a predetermined pulse width vibrating the vibration generator by resonance, and a deceleration period including at least one second pulse of a phase opposite to a phase of the first pulse; and
a vibration control portion configured to change a number of first pulses included in the driving signal supplied to the vibration generator by the driving circuit portion according to an operating environment, wherein
the operating environment includes the operating temperature, and
when the operating temperature reaches a predetermined threshold temperature, the vibration control portion reduces the number of first pulses.

6. The electronic device according to claim 5, wherein the vibration control portion estimates the operating temperature based on an operation frequency of the vibration generator.

7. A control method comprising:
in response to contact with an input portion, supplying a driving signal with a driving circuit portion, the driving signal having an acceleration period including at least one first pulse of a predetermined pulse width configured to vibrate a vibration generator by resonance and a deceleration period including at least one second pulse of a phase opposite to the phase of the first pulse to the vibration generator;
vibrating the input portion with the vibration generator based on the driving signal; and
changing a number of first pulses included in the driving signal according to an operating environment with a vibration control portion, wherein
the operating environment includes an operating voltage of the driving circuit portion which is a driving voltage of the driving signal, and
the number of first pulses is changed according to a comparison of a predetermined threshold value and the operating voltage so as to make a maximum acceleration of the vibration fall within a predetermined range.

* * * * *